(12) United States Patent
Amerla et al.

(10) Patent No.: US 9,776,508 B2
(45) Date of Patent: Oct. 3, 2017

(54) POWER TAKE-OFF UNIT WITH HYDRAULIC DISCONNECT

(71) Applicant: American Axle & Manufacturing, Inc., Detroit, MI (US)

(72) Inventors: Mario Amerla, Macomb, MI (US); Christopher D. Pump, Macomb, MI (US); Paul Reichert, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 341 days.

(21) Appl. No.: 14/687,011

(22) Filed: Apr. 15, 2015

(65) Prior Publication Data

US 2015/0298544 A1 Oct. 22, 2015

Related U.S. Application Data

(60) Provisional application No. 61/980,625, filed on Apr. 17, 2014.

(51) Int. Cl.
*B60K 23/08* (2006.01)
*F16H 57/04* (2010.01)
*F16H 57/029* (2012.01)
*B60K 17/344* (2006.01)

(52) U.S. Cl.
CPC ............ *B60K 23/08* (2013.01); *B60K 17/344* (2013.01); *F16H 57/029* (2013.01); *F16H 57/0495* (2013.01); *B60K 2023/0833* (2013.01); *B60K 2023/0858* (2013.01); *B60Y 2400/421* (2013.01); *B60Y 2400/82* (2013.01)

(58) Field of Classification Search
CPC .................. B60K 23/08; B60K 17/344; B60K 2023/0858; B60K 2023/0833; F16H 57/0495; F16H 57/029; B60Y 2400/82; B60Y 2400/421
See application file for complete search history.

(56) References Cited

U.S. PATENT DOCUMENTS

| | | | |
|---|---|---|---|
| 4,601,359 A | 7/1986 | Weismann et al. | |
| 8,047,323 B2 | 11/2011 | Downs et al. | |
| 8,215,440 B2 | 7/2012 | Hoffmann et al. | |
| 8,661,942 B2 | 3/2014 | Schwekutsch et al. | |
| 8,720,633 B2 | 5/2014 | Grutter et al. | |

(Continued)

FOREIGN PATENT DOCUMENTS

| | | |
|---|---|---|
| RU | 50473 U1 | 1/2006 |
| SU | 1323421 A1 | 7/1987 |
| WO | WO-2009/096975 A1 | 8/2009 |

OTHER PUBLICATIONS

PCT International Search Report dated Dec. 8, 2016 for corresponding PCT application No. PCT/US2015/026341, filed Apr. 17, 2015.

*Primary Examiner* — Victor MacArthur
(74) *Attorney, Agent, or Firm* — Harness, Dickey & Pierce, P.L.C.

(57) ABSTRACT

An all-wheel drive vehicle driveline that includes a housing assembly with a housing structure and a cover. In one form, components of the driveline can be assembled to the housing structure and cover in such a way that an intermediate shaft, which is assembled to the cover, and an input shaft, which can be rotatably mounted to the housing structure, can be slidably engaged to one another. In another form, the cover defines a reservoir that is configured to feed fluid to a pump that is mounted to the cover.

20 Claims, 7 Drawing Sheets

(56) References Cited

U.S. PATENT DOCUMENTS

2010/0038164 A1 2/2010 Downs et al.
2012/0204664 A1 8/2012 Peura et al.
2013/0337960 A1 12/2013 Valente et al.
2015/0057125 A1 2/2015 Pump et al.

POWER TAKE-OFF UNIT WITH HYDRAULIC DISCONNECT

CROSS-REFERENCE TO RELATED APPLICATIONS

This application claims the benefit of U.S. Provisional Application No. 61/980,625, filed on Apr. 17, 2014, the entire disclosure of which is incorporated by reference as if fully set forth in detail herein.

FIELD

The present disclosure relates to a power take-off unit with a hydraulic disconnect.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction. Such AWD vehicles are typically equipped with a much more complex drivetrain (relative to a FWD architecture) which, in addition to the primary driveline, must include the additional components associated with the secondary driveline such as a power take-off unit and a propshaft.

In an effort to minimize driveline losses associated with rotating components in the secondary driveline, which are either driven by the primary driveline or back-driven by the vehicle wheels, it is known to incorporate a disconnect system that is configured to uncouple components of the secondary driveline such as, for example, the rear wheels or the rear differential from the remainder of the secondary driveline. To this end, there remains a need in the art for development of improved driveline components for use in the disconnectable drivelines of AWD vehicles.

SUMMARY

This section provides a general summary of the disclosure, and is not a comprehensive disclosure of its full scope or all of its features.

In one form, the present disclosure provides an all-wheel drive vehicle driveline that includes a housing assembly, an input shaft, an intermediate shaft, first and second bearings, a third bearing, a clutch, a bevel ring gear, a bevel pinion gear and an output shaft. The housing assembly has a housing structure and a cover. The housing structure defines a first bore, which is disposed about a first axis, and a second bore that is disposed about a second axis that is not parallel to the first axis. The cover is removably mounted to the housing structure and defines first and second bearing mounts that are spaced apart along the first axis. The input shaft that is configured to be coupled to an input of a differential mechanism for common rotation about the first axis. The intermediate shaft that is concentric with the input shaft and defines third and fourth bearing mounts that are spaced apart along the first axis. The first bearing is mounted to the first and third bearing mounts to support the intermediate shaft for rotation about the first axis relative to the cover. The second bearing is mounted to the second and fourth bearing mounts to support the intermediate shaft for rotation about the first axis relative to the cover. Each of the first and second bearings is configured to transmit thrust loads in an associated direction along the first axis. The third bearing is disposed between the input shaft and the intermediate shaft and comprises a plurality of cylindrical rollers. The clutch has a first clutch member, which is coupled to the input shaft for rotation therewith, and a second clutch member that is coupled to the intermediate shaft for rotation therewith. The clutch is configured to selectively transmit rotary power between the input shaft and the intermediate shaft. The bevel ring gear is mounted to the intermediate shaft for rotation therewith. The bevel pinion gear is meshingly engaged to the bevel ring gear and rotatable about the second axis. The output shaft is coupled to the bevel pinion for rotation therewith.

In another form, the present disclosure provides an all-wheel drive vehicle driveline that includes a housing assembly, an input shaft, an intermediate shaft, a disconnect mechanism, a bevel ring gear, a bevel pinion gear, an output shaft and a pump. The housing assembly has a housing structure and a cover. The housing structure defines a first bore, which is disposed about a first axis, and a second bore, which is disposed about a second axis that is not parallel to the first axis and a first sump. The cover is removably mounted to the housing structure and defines a pump mount and a reservoir that is in fluid connection with the pump mount. The reservoir is defined by the cover and is disposed vertically at a level that is different from the sump. The input shaft is configured to be coupled to an input of a differential mechanism for common rotation about the first axis. The intermediate shaft is concentric with the input shaft. The disconnect mechanism has a clutch and an actuator assembly. The clutch has a first clutch member, which is coupled to the input shaft for rotation therewith, and a second clutch member that is coupled to the intermediate shaft for rotation therewith. The clutch is configured to selectively transmit rotary power between the input shaft and the intermediate shaft. The actuator assembly has a piston that is configured to translate the first clutch member along the first axis between a first position and a second position. The bevel ring gear is mounted to the intermediate shaft for rotation therewith. The bevel pinion gear is meshingly engaged to the bevel ring gear and rotatable about the second axis. The output shaft is coupled to the bevel pinion for rotation therewith. The pump is mounted to the pump mount and has an inlet that is coupled in fluid connection to the reservoir in the cover. The pump is selectively operable for providing pressurized fluid to the piston of the actuator assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
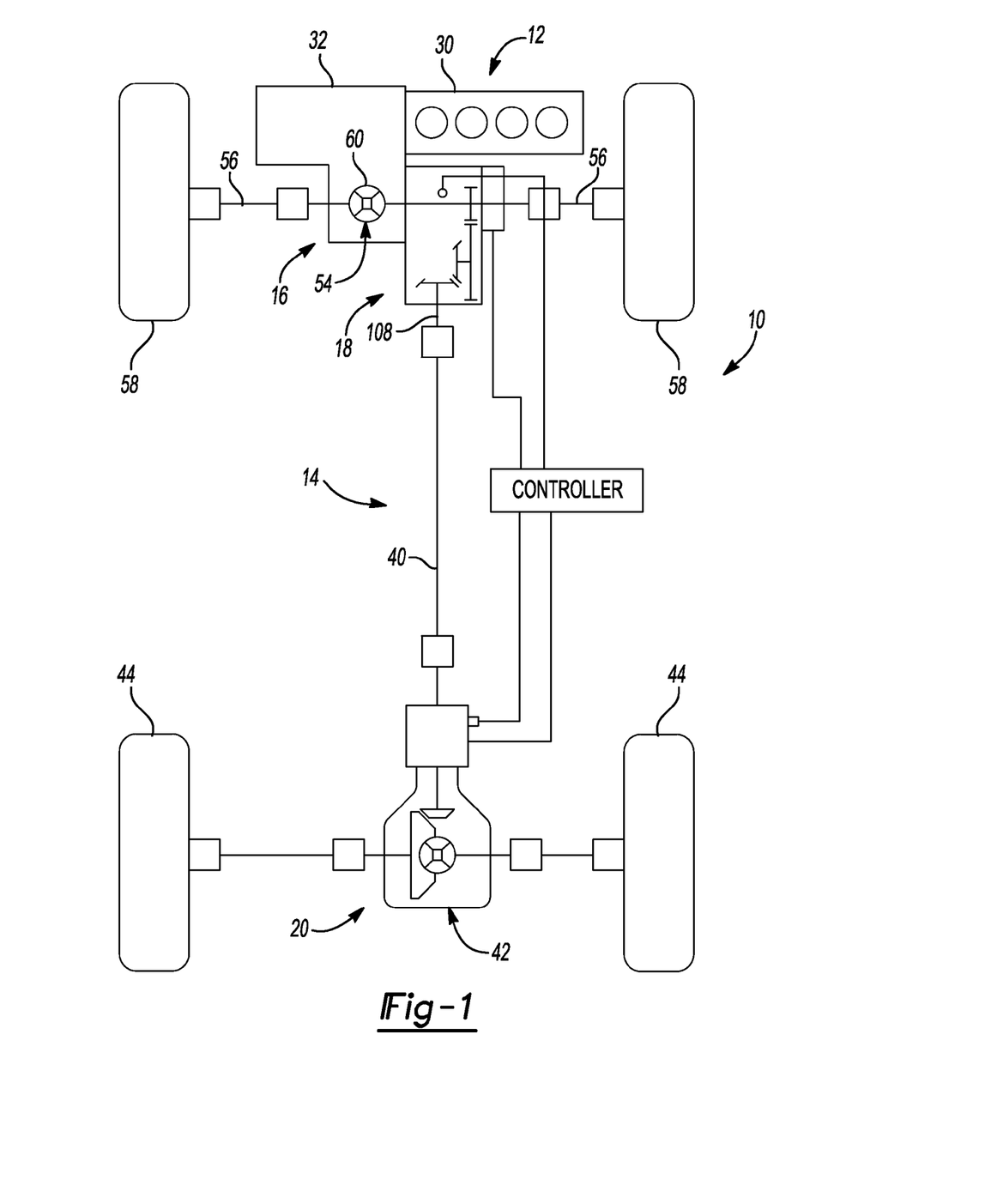
FIG. 1 is a schematic illustration of a vehicle having a disconnecting AWD driveline having a power take-off unit constructed in accordance with the teachings of the present disclosure.

With reference to FIG. 1 of the drawings, an exemplary vehicle 10 is illustrated to include a powertrain 12 and a drivetrain 14 that can include a primary driveline 16, a power take-off unit (PTU) 18, and a secondary driveline 20. The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which output rotary power to the primary driveline 16 and the PTU 18. The PTU 18 can be selectively operated to transmit rotary power to the secondary driveline 20. In the particular example provided, the secondary driveline 20 includes a propshaft 40 and a rear axle assembly 42 that is configured to receive rotary power from the propshaft 40 and to responsively drive a set of vehicle wheels 44. The PTU 18 includes a PTU output member 108 that is rotatably coupled to the propshaft 40. As will be discussed in more detail below, the PTU 18 includes a disconnect mechanism to selectively control power transmission through the PTU 18 to thereby selectively drive the propshaft 40.

The primary driveline 16 can include a first differential 54 and a pair of half-shafts 56 that can couple an output of the first differential 54 to another set of vehicle wheels 58. Except as noted herein, the first differential 54 can be conventional in its construction and operation and as such, need not be discussed in significant detail herein. Briefly, the first differential 54 can include a differential case 60, which can be driven by the transmission 32, and a means for transmitting rotary power between the differential case 60 and the half-shafts 56. Typically, the rotary power transmitting means is an open differential gearset that permits speed and torque differentiation between the half-shafts 56, but those of ordinary skill in the art will appreciate that other types of rotary power transmitting means could be employed in the alternative, such as one or more clutches or other types of differential gearsets, including limited slip and locking differential gearsets.

Figure 2:
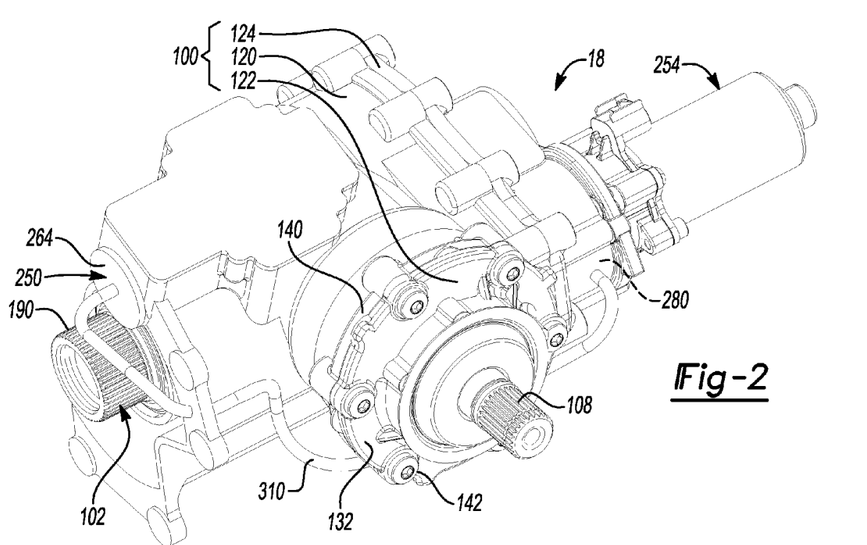
FIG. 2 is a perspective view of the power take-off unit that is schematically illustrated in FIG. 1.
Figure 3:
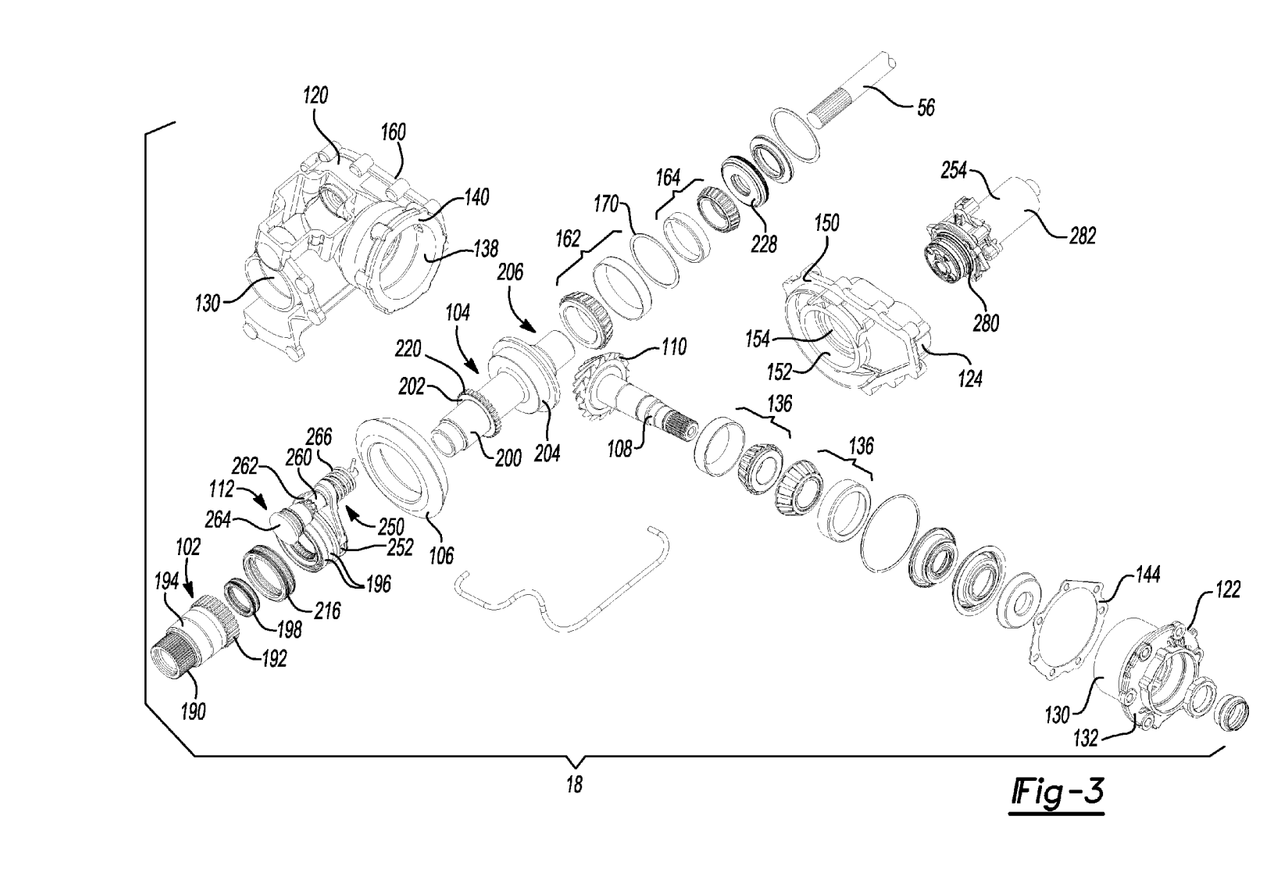
FIG. 3 is an exploded perspective view of the power take-off unit of FIG. 2.

With reference to FIGS. 2 and 3, the PTU 18 is illustrated in more detail. The PTU 18 can include a housing assembly 100, a PTU input member 102, a spindle 104, a ring gear 106, the PTU output member 108, a pinion gear 110, which is coupled to the PTU output member 108 for common rotation, and a disconnect mechanism 112.

The housing assembly 100 can include a housing 120, a pinion mount 122 and an end cover 124. The housing 120 can be configured to be coupled to a structure (not specifically shown) into which the first differential 54 (FIG. 1) is received. The housing 120 can define a cavity 130 into which the PTU input member 102, the spindle 104, the ring gear 106, the pinion gear 110 and portions of the disconnect mechanism 112 can be received.

Figure 5:
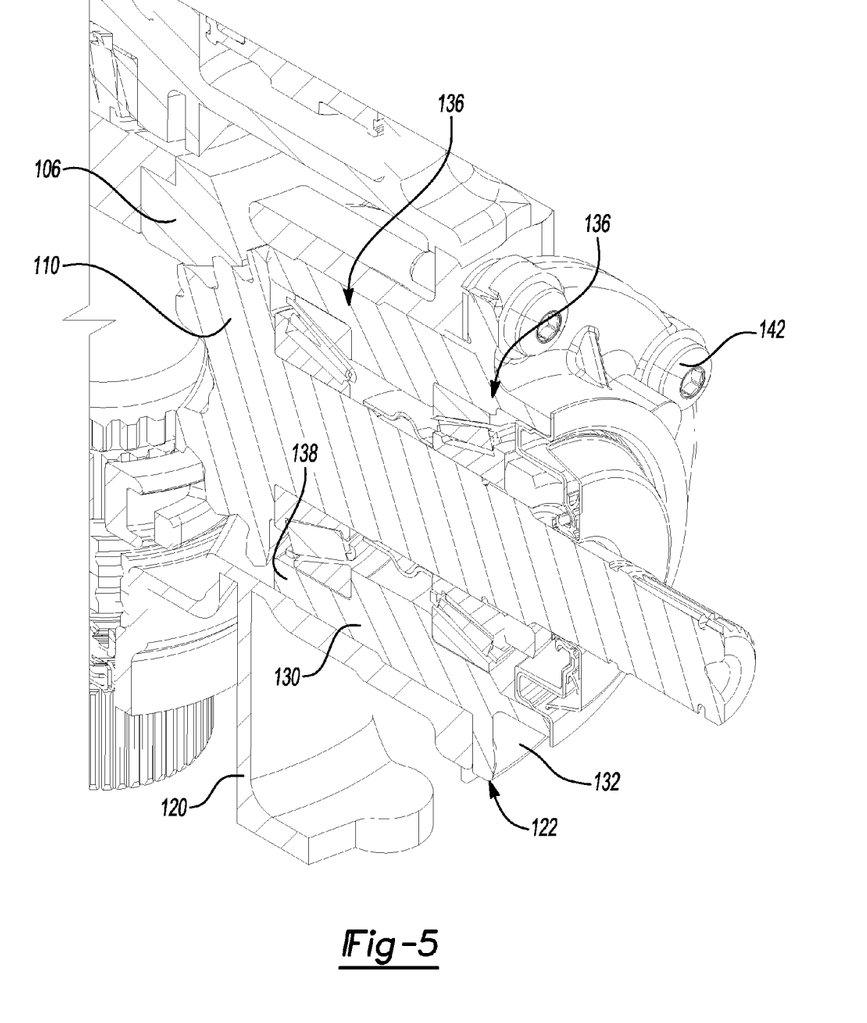
FIG. 5 is a section view of a portion of the power take-off unit of FIG. 2 taken through a rotational axis of an output member of the power take-off unit.

With reference to FIGS. 2, 3 and 5, the pinion mount 122 can have a generally hollow cylindrical body portion 130 and an annular flange 132 that can extend circumferentially about the body portion 130. The body portion 130 can be configured to house the PTU output member 108, as well as a pair of output shaft bearings 136 that can support the PTU output member 108 for rotation relative to the pinion mount 122. The body portion 130 can be received into an aperture 138 in the housing 120 and the annular flange 132 can be abutted against a mating flange 140 on the housing 120. Threaded fasteners 142, which can be fitted through holes in the annular flange 132 and threaded into holes in the mating flange 140, can be employed to secure the pinion mount 122 to the housing 120. If desired, a gasket 144 can be employed to form a seal between the pinion mount 122 and the housing 120. In the particular example provided, the gasket 144 is disposed between the annular flange 132 and the mating flange 140, but those of skill in the art will appreciate that other sealing arrangements are possible.

Figure 6:
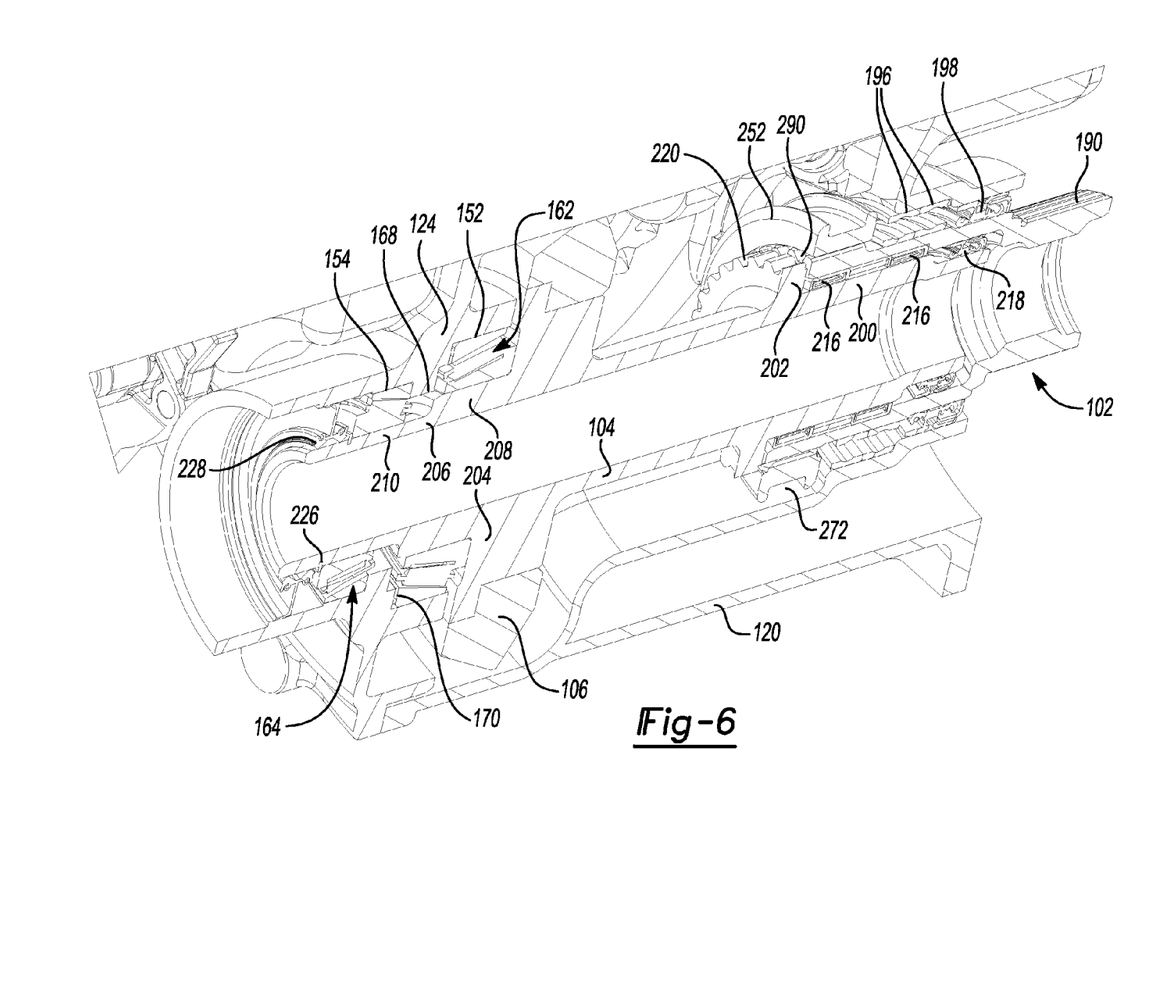
FIG. 6 is a section view of a portion of the power take-off unit of FIG. 2 taken through a rotational axis of a spindle of the power take-off unit.

With reference to FIGS. 3 and 6, the end cover 124 can be configured to close an end of the housing 120 opposite the structure (not shown) into which the first differential 54 (FIG. 1) is received. The end cover 124 can define a mounting flange 150 and first and second bearing mounts 152 and 154, respectively. The mounting flange 150 can be abutted against a corresponding flange 160 on the housing 120 and threaded fasteners (not specifically shown) can be received through holes in the mounting flange 150 and threaded into holes in the flange 160 on the housing 120 to fixedly couple the end cover 124 to the housing 120. If desired, a gasket or sealant (not shown) can be employed to form a seal between the end cover 124 and the housing 120. The first and second bearing mounts 152 and 154 can be configured to receive first and second bearings 162 and 164, respectively, that can support the spindle 104 for rotation. In the example provided, an annular wall member 168 can be disposed between the first and second bearing mounts 152 and 154. If desired, one or more spacers 170 can be employed to space the first and second bearings 162 and 164 apart from one another such that they are preloaded to a desired degree when the end cover 124 is assembled to the housing 120.

The PTU input member 102 can be a hollow shaft structure having a splined input end 190, a splined output end 192, and a bearing mount 194 disposed between the splined input and output ends 190 and 192. The splined input end 190 is configured to matingly engage an internally splined portion of the differential case 60 (FIG. 1) of the first differential 54 (FIG. 1) such that rotation of the differential case 60 (FIG. 1) causes corresponding rotation of the PTU input member 102. The bearing mount 194 can be configured to receive thereon one or more bearings 196 that can support the PTU input member 102 for rotation relative to the housing 120. A shaft seal 198 can be received between the housing 120 and the PTU input member 102.

The spindle 104 can be a hollow, unitarily formed structure and can include a first mounting end 200, a coupling portion 202, a ring gear mount 204, and third and fourth bearing mounts 208 and 210, respectively. The first mounting end 200 can be sized to be received into the PTU input member 102. In the example provided, a pair of needle bearings 216, which are engaged to an interior surface of the PTU input member 102 and an outer surface of the first mounting end 200, are employed to support the PTU input member 102 for rotation on the first mounting end 200. A shaft seal 218, which is fixedly coupled to an inner surface of the PTU input member 102, is sealingly engaged to an end of the first mounting end 200. The coupling portion 202 comprises a plurality of teeth 220. Optionally, the coupling portion 202 could be formed as a discrete component that can be fixedly coupled to a remainder of the spindle 104. The ring gear mount 204 comprises a flange that extends outwardly from a hollow shaft-shaped portion of the spindle 104. The third and fourth bearing mounts 208 and 210 are spaced apart along the spindle 104 and are configured to receive inner bearing races of the first and second bearings 162 and 164, respectively. The inner bearing race of the first bearing 162 can be abutted against a rear side of the ring gear mount 204. A snap ring 226, which can be configured to be received into a groove in the fourth bearing mount 210, can be abutted against the inner bearing race of the second bearing 164. A shaft seal 228 can be received in the end cover 124 and can sealingly engage the fourth bearing mount 210. One of the half-shafts 56 can be received coaxially through the spindle 104 and can be driving engaged with one of the outputs of the first differential 54.

The ring gear 106 can be coupled to the ring gear mount 204 on a side that is opposite the inner bearing race of the first bearing 162 (i.e., so that the ring gear mount 204 is disposed between the ring gear 106 and the first bearing 162). Any desired means can be employed to couple the ring gear 106 to the ring gear mount 204, including threaded fasteners and welds. The pinion gear 110 (FIG. 5) can be coupled to the PTU output member 108 (FIG. 5) for common rotation and can be meshingly engaged to the ring gear 106.

Figure 4:
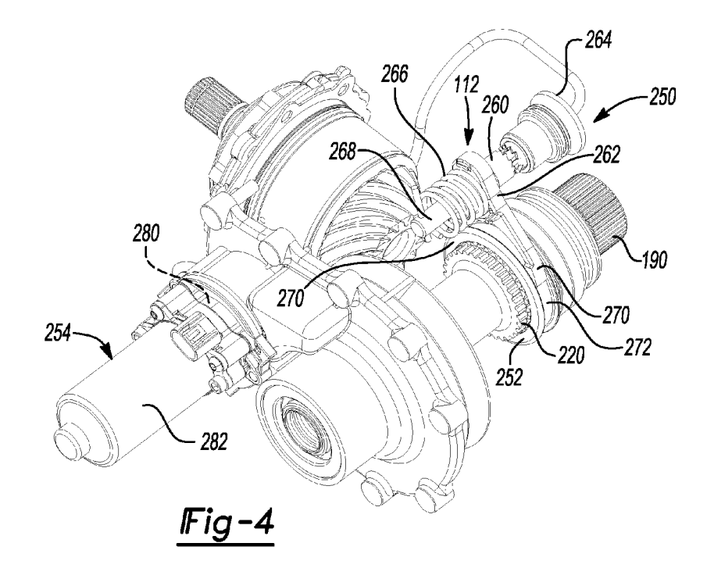
FIG. 4 is a perspective view of a portion of the power take-off unit illustrated in FIG. 2 in which a portion of the housing assembly is not shown so as to better see the internal components of the power take-off unit.

With reference to FIGS. 3, 4 and 6, the disconnect mechanism 112 can comprise an actuator assembly 250, a clutch member 252 and a power source 254. The actuator assembly 250 can be generally similar to the actuator assembly that is disclosed in U.S. Provisional Patent Application No. 61/942,364 filed Feb. 20, 2014, the disclosure of which is incorporated by reference. Briefly the actuator assembly 250 includes an indexing ring 260, a shift member 262, a linear motor 264 and a biasing spring 266. The indexing ring 260 and the shift member 262 can be axially slidably mounted on a shift rod 268. The shift member 262 can be a clutch fork having arms 270 that are received in a groove 272 (FIG. 6) formed about the clutch member 252. The linear motor 264 can have a hydraulically-operated piston (not specifically shown) that can be configured to move an output member from a retracted position into an extended position to cause motion of the indexing ring 260 (including sliding motion of the indexing ring 260 on the shift rod 268), which causes corresponding axial sliding motion of the shift member 262 along the shift rod 268. The biasing spring 266 can be employed to bias the shift member 262, the indexing ring 260 and the output member of the linear motor 264 in a predetermined direction coincident with the axis of the shift rod 268. For example, the biasing spring 266 can exert a force that biases the output member of the linear motor 264 toward the retracted position. In the particular example provided, the linear motor 264 comprises a hydraulic cylinder that receives fluid power from the power source 254, which comprises a pump 280 and an electric motor 282.

The clutch member 252 can have a plurality of internal teeth 290 (FIG. 6) that can be slidably received on the spline teeth of the splined output end 192 of the PTU input member 102. The linear motor 264 can be operated to cause the actuator assembly 250 to move the clutch member 252 axially along the spline teeth of the splined output end 192 such that the internal teeth 290 engage with the teeth 220 of the coupling portion 202 that is formed on the spindle 104. In this condition, the disconnect mechanism 112 is operable for transmitting rotary power between the PTU input member 102 and the spindle 104 so that rotary power is transmitted through the PTU 18 (FIG. 2) to the propshaft 40 (FIG. 1). The linear motor 264 can also be operated to permit the actuator assembly 250 (i.e., the biasing spring 266 and the shift member 262) to move the clutch member 252 so that the internal teeth 290 are disengaged from the teeth 220 on the coupling portion 202 of the spindle 104. In this condition, the disconnect mechanism 112 is operable for inhibiting the transmission of rotary power between the PTU input member 102 and the spindle 104 so that power is not transmitted through the PTU 18 (FIG. 2) to the propshaft 40 (FIG. 1).

With reference to FIGS. 2, 3 and 4, the power source 254 can be mounted to the housing 100 in a desired location, such as an exterior side of the end cover 124.

Figure 9:
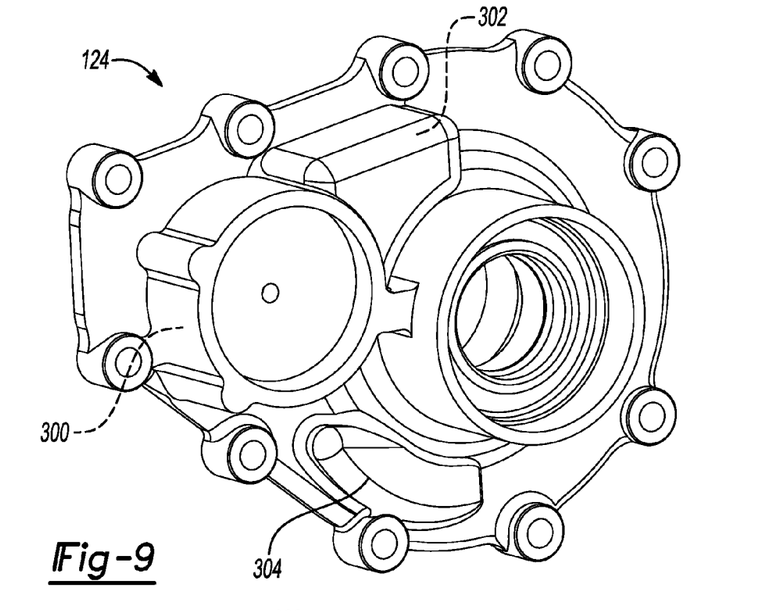
FIGS. 9 and 10 are front and rear elevation views of a portion of the power take-off unit of FIG. 2, illustrating the end cover in more detail. Corresponding reference numerals indicate corresponding parts throughout the several views of the drawings.
Figure 10:
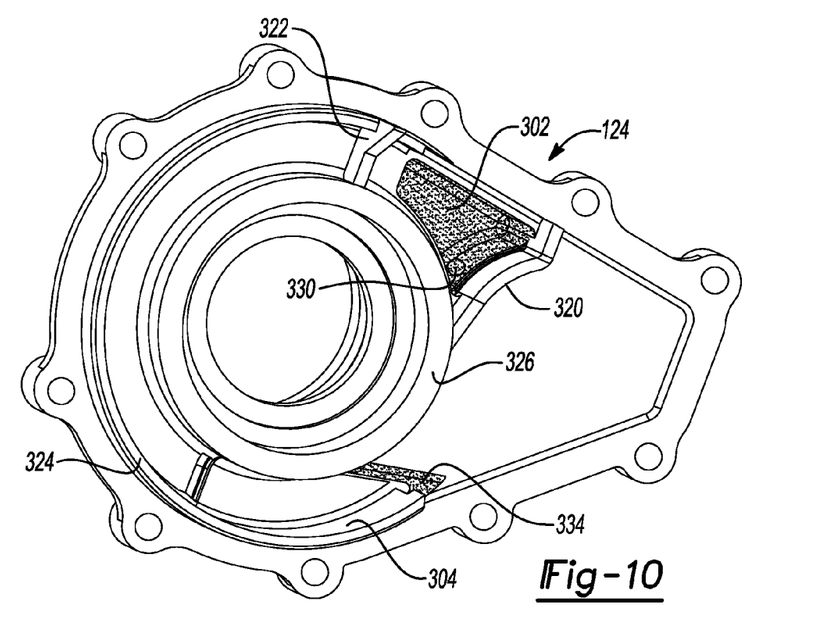

With reference to FIGS. 9 and 10, the end cover 124 can define a pump mount 300 and one or more sumps. In the particular example provided, the end cover 124 defines a first sump 302 and a second sump 304. The pump mount 300 can be sized to receive a desired portion of the pump 280 (FIG. 3) and can be in fluid communication with each of the first and second sumps 302 and 304. In the example provided, the first sump 302 is located vertically above the pump mount 300 and is configured to drain (via gravity) a hydraulic fluid (i.e., lubricant) from the first sump 302 into the pump mount 300, while the second sump 304 is located vertically below the pump mount 300 so that suction pressure created during operation of the pump 280 (FIG. 3) would be needed to draw the hydraulic fluid from the second sump 304 into the pump mount 300. With reference to FIG. 2, any type or types of fluid conduit can be employed to couple the output of the pump 280 to the linear motor 264 of the actuator assembly 250, including one or more discrete tubes (e.g., tube 310) and/or cavities or galleries within the housing assembly 100.

Figure 7:
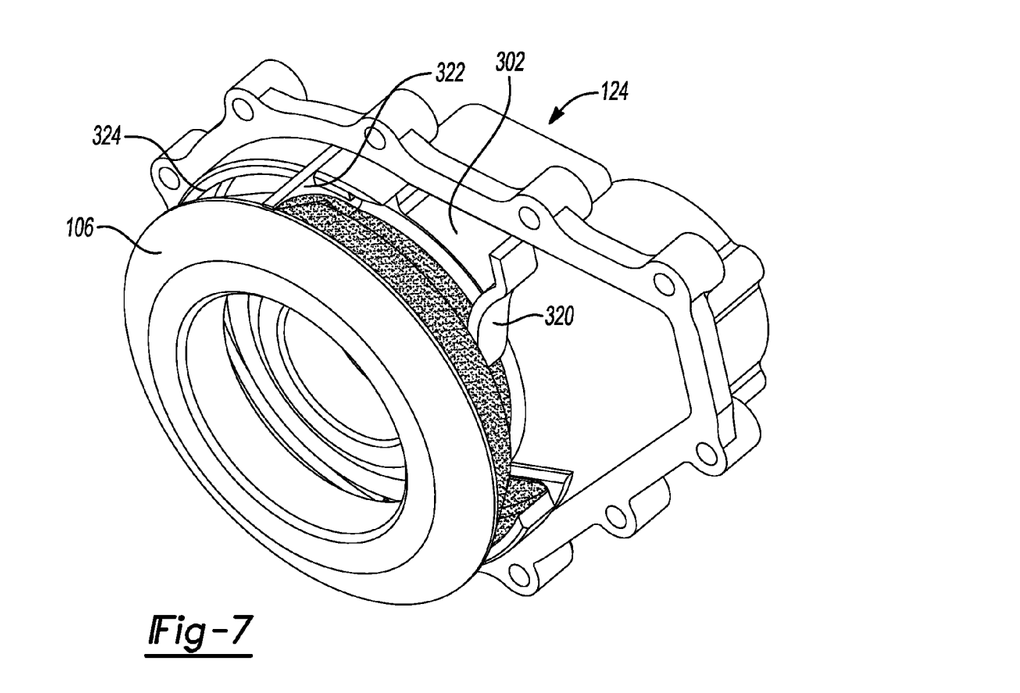
FIG. 7 is a perspective view of a portion of the power take-off unit of FIG. 2 that depicts a ring gear adjacent an end cover of a housing assembly.
Figure 8:
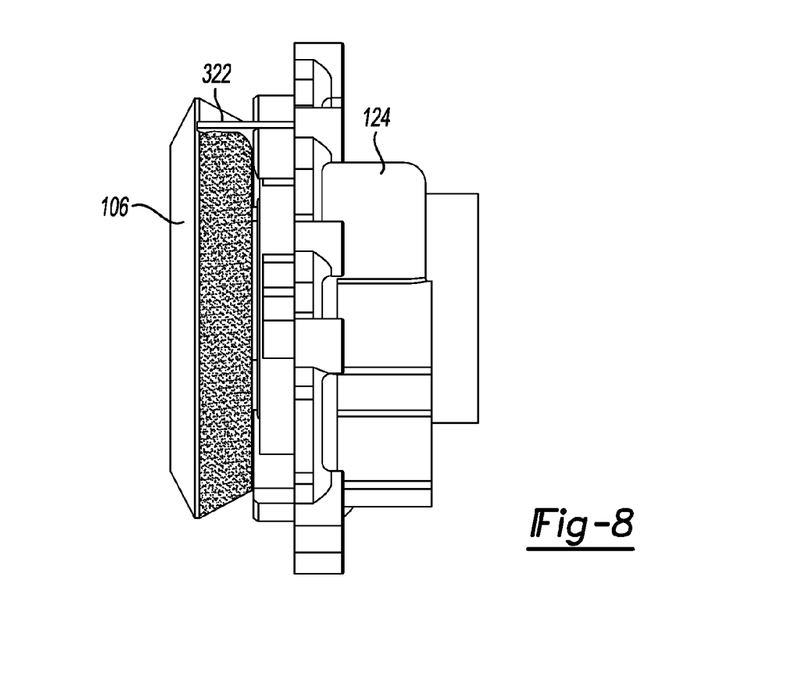
FIG. 8 is a side elevation view of the portion of the power take-off unit that is illustrated in FIG. 7.

With reference to FIGS. 7, 8 and 10, the end cover 124 can include a first sump wall 320, a scraper 322 and a second sump wall 324. The first sump wall 320 can define a first side of the first sump 302 and can extend outwardly from an annular wall 326 into which the outer bearing race of the first bearing 162 (FIG. 6) is received. The first sump wall 320 is contoured to avoid contact with the ring gear 106 and also to permit lubricant that clings to the ring gear 106 as the ring gear 106 rotates to pass by the first sump wall 320. The scraper 322 can define a side of the first sump 302 that is opposite the first sump wall 320. The scraper 322 can be contoured to the ring gear 106 in a manner that permits the scraper 322 to remove a portion of the lubricant that clings to the ring gear 106 as the ring gear 106 rotates. The lubricant that is scraped from the ring gear 106 is received in the first sump 302 and can drain through a first sump outlet 330 into the pump mount 300 (FIG. 9). Due to centrifugal force, a portion of the lubricant that remained on the ring gear 106 after it passed by the scraper 322 can be slung from the ring gear 106 in a radially outward direction. A portion of the lubricant that is slung from the ring gear 106 can impinge upon the arcuately-shaped second sump wall 324, which can direct the collected lubricant into the second sump 304 so that it can be transmitted via a second sump outlet 334 to the pump mount 300 (FIG. 9).

With reference to FIG. 3, it will be appreciated that the outer bearing races of the first and second bearings 162 and 164, the bearing elements (shown as tapered rollers) of the second bearing 164, the shaft seal 228, and the power source 254 can be pre-assembled to the end cover 124 prior to assembly of the end cover 124 to the housing 120. It will also be appreciated that the PTU output member 108, the pinion gear 108, the output shaft bearings 136 and the gasket 144 can be assembled to the pinion mount 122 prior to assembly of the pinion mount 122 to the housing 120.

While the disconnect mechanism 112 has been illustrated and described as having a collar-like clutch member 252 having internal teeth 290 that are engagable to the teeth 220 on the coupling portion 202 of the spindle 104, it will be appreciated that the disconnect mechanism could be configured somewhat differently. For example, the clutch member 252 could be configured as part of a dog clutch (not shown) in which the clutch member 252 additionally has a plurality of dog clutch teeth (not shown) that can be selectively engaged to corresponding dog clutch teeth (not shown) on an element (not shown) that is axially and rotatably fixed to the coupling portion 202 of the spindle 104.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An all-wheel drive vehicle driveline comprising:
a housing assembly having a housing structure and a cover, the housing structure defining a first bore, which is disposed about a first axis, and a second bore that is disposed about a second axis that is not parallel to the first axis, the cover being removably mounted to the housing structure and defining first and second bearing mounts that are spaced apart along the first axis;
an input shaft that is adapted to be coupled to an input of a differential mechanism for common rotation about the first axis;
an intermediate shaft that is concentric with the input shaft, the intermediate shaft defining third and fourth bearing mounts that are spaced apart along the first axis;
first and second bearings, the first bearing being mounted to the first and third bearing mounts to support the intermediate shaft for rotation about the first axis relative to the cover, the second bearing being mounted to the second and fourth bearing mounts to support the intermediate shaft for rotation about the first axis relative to the cover, each of the first and second bearings being configured to transmit thrust loads in an associated direction along the first axis;
a third bearing disposed between the input shaft and the intermediate shaft, the third bearing comprising a plurality of cylindrical rollers;
a clutch having a first clutch member, which is coupled to the input shaft for rotation therewith, and a second clutch member that is coupled to the intermediate shaft for rotation therewith, the clutch being configured to selectively transmit rotary power between the input shaft and the intermediate shaft;
a bevel ring gear mounted to the intermediate shaft for rotation therewith;
a bevel pinion gear meshingly engaged to the bevel ring gear and rotatable about the second axis; and
an output shaft coupled to the bevel pinion for rotation therewith.

2. The all-wheel drive vehicle driveline of claim 1, wherein the intermediate shaft is received into the input shaft.

3. The all-wheel drive vehicle driveline of claim 1, wherein each of the first and second bearings has an inner bearing race and wherein one of the inner bearing races is abutted against the ring gear and the other one of the inner bearing races is abutted against a retaining ring that is mounted to the intermediate shaft.

4. The all-wheel drive vehicle driveline of claim 1, wherein each of the first and second bearings has an outer bearing race and wherein one of the outer bearing races is abutted against the cover and the other one of the outer bearing races is abutted against a retaining ring that is mounted to the cover.

5. The all-wheel drive vehicle driveline of claim 1, wherein the cover defines a pump mount and wherein the all-wheel drive vehicle driveline comprises a pump that is mounted to the cover.

6. The all-wheel drive vehicle driveline of claim 5, wherein the housing assembly includes a lubricant for lubricating the first and second bearings and meshing of the bevel ring gear with the bevel pinion gear, and wherein the cover further defines a scraper that is configured to skim lubricant off the bevel ring gear as the bevel ring gear rotates.

7. The all-wheel drive vehicle driveline of claim 6, wherein the cover defines a pump sump that is configured to direct a portion of the lubricant to an intake of the pump.

8. The all-wheel drive vehicle driveline of claim 1, further comprising third and fourth bearings, wherein the housing assembly further comprises a pinion mount, wherein the third and fourth bearings support the output shaft for rotation relative to the pinion mount, and wherein the pinion mount is received into a bore formed in the housing structure and is fixedly coupled to the housing structure.

9. The all-wheel drive vehicle driveline of claim 1, wherein the clutch comprises a first toothed element, which is coupled to the input shaft for rotation therewith, a second toothed element, which is coupled to the intermediate shaft for rotation therewith, and a collar that is slidable along the first axis into a position where it engages the first and second toothed elements.

10. The all-wheel drive vehicle driveline of claim 1, wherein one of the first and second clutch members is axially movable along the first axis.

11. An all-wheel drive vehicle driveline comprising:
a housing assembly having a housing structure and a cover, the housing structure defining a first bore, which is disposed about a first axis, a second bore, which is disposed about a second axis that is not parallel to the first axis, and a first sump, the cover being removably mounted to the housing structure and defining a pump mount and a reservoir that is in fluid connection with the pump mount, the reservoir being defined by the cover and being disposed vertically at a level that is different from the first sump;

an input shaft that is adapted to be coupled to an input of a differential mechanism for common rotation about the first axis;

an intermediate shaft that is concentric with the input shaft;

a disconnect mechanism having a clutch and an actuator assembly, the clutch having a first clutch member, which is coupled to the input shaft for rotation therewith, and a second clutch member that is coupled to the intermediate shaft for rotation therewith, the clutch being configured to selectively transmit rotary power between the input shaft and the intermediate shaft, the actuator assembly having a piston that is configured to translate the first clutch member along the first axis between a first position and a second position;

a bevel ring gear mounted to the intermediate shaft for rotation therewith;

a bevel pinion gear meshingly engaged to the bevel ring gear and rotatable about the second axis;

an output shaft coupled to the bevel pinion for rotation therewith; and a pump mounted to the pump mount, the pump having an inlet that is coupled in fluid connection to the reservoir in the cover, the pump being selectively operable for providing pressurized fluid to the piston of the actuator assembly.

12. The all-wheel drive vehicle driveline of claim 11, further comprising first and second bearings, wherein the cover defines first and second bearing mounts that are spaced apart along the first axis, wherein the intermediate shaft defines third and fourth bearing mounts that are spaced apart along the first axis, wherein the first bearing is mounted to the first and third bearing mounts to support the intermediate shaft for rotation about the first axis relative to the cover, wherein the second bearing is mounted to the second and fourth bearing mounts to support the intermediate shaft for rotation about the first axis relative to the cover, each of the first and second bearings being configured to transmit thrust loads in an associated direction along the first axis.

13. The all-wheel drive vehicle driveline of claim 12, wherein the housing assembly includes a lubricant for lubricating the first and second bearings and meshing of the bevel ring gear with the bevel pinion gear, and wherein the cover further defines a scraper that is configured to skim lubricant off the bevel ring gear as the bevel ring gear rotates.

14. The all-wheel drive vehicle driveline of claim 13, wherein the scraper directs lubricant skimmed off of the bevel ring gear by the scraper is directed toward the reservoir.

15. The all-wheel drive vehicle driveline of claim 12, further comprising a third bearing that is disposed between the input shaft and the intermediate shaft.

16. The all-wheel drive vehicle driveline of claim 15, wherein the third bearing comprises a plurality of cylindrical rollers.

17. The all-wheel drive vehicle driveline of claim 11, further comprising first and second bearings, wherein the housing assembly further comprises a pinion mount, wherein the first and second bearings support the output shaft for rotation relative to the pinion mount, and wherein the pinion mount is received into a bore formed in the housing structure and is fixedly coupled to the housing structure.

18. The all-wheel drive vehicle driveline of claim 11, further comprising a first seal that sealingly engages the housing structure and the input shaft.

19. The all-wheel drive vehicle driveline of claim 18, further comprising a second seal that sealingly engages the input shaft and the intermediate shaft.

20. The all-wheel drive vehicle driveline of claim 18, further comprising a second seal that sealingly engages the cover and the intermediate shaft.

* * * * *